Nov. 29, 1949     A. S. BILGER     2,489,740
SUSPENDED MONORAIL BRAKE
Filed Sept. 16, 1947
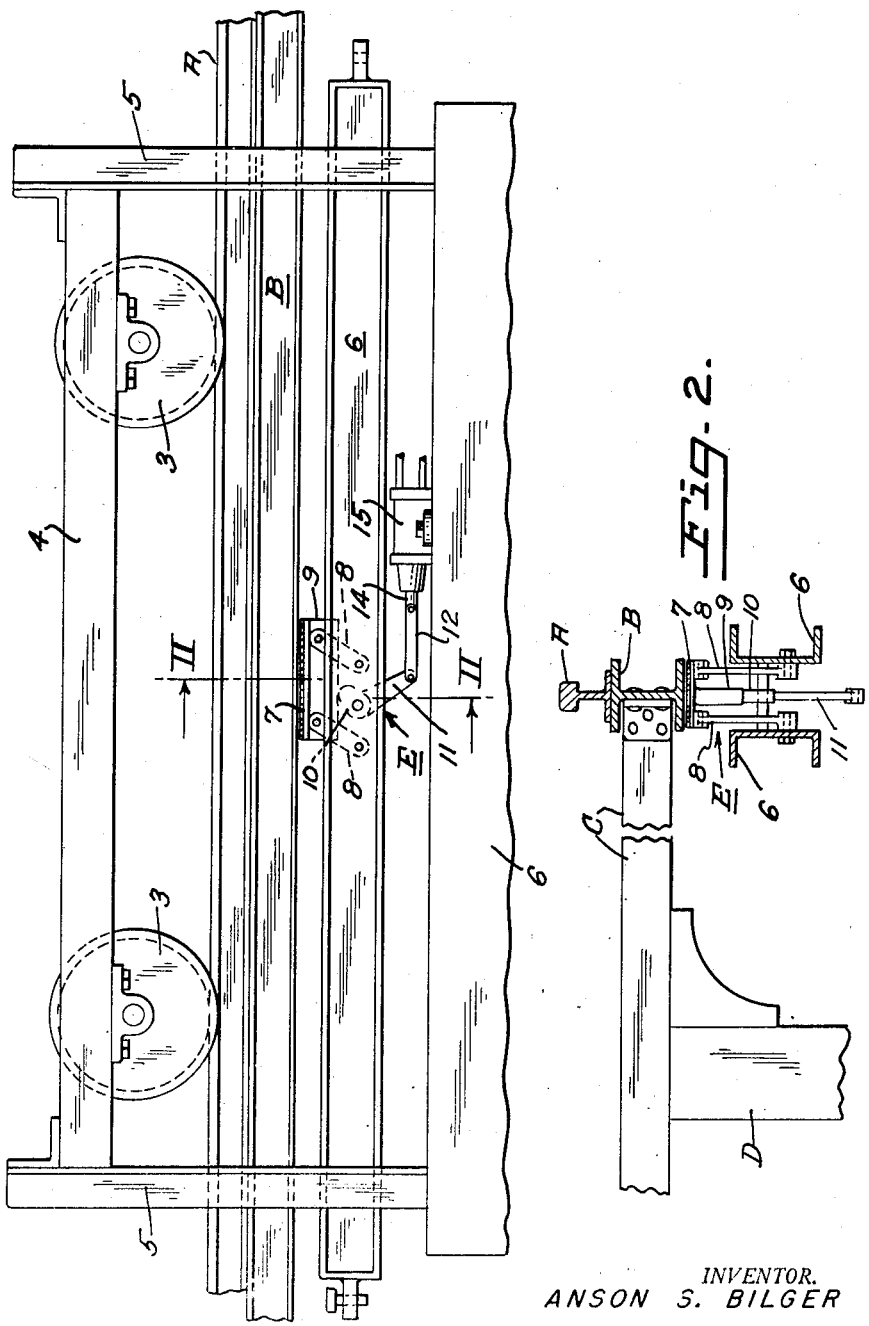
INVENTOR.
ANSON S. BILGER
BY Thomas Castberg
ATTORNEY Patented Nov. 29, 1949

2,489,740

UNITED STATES PATENT OFFICE 2,489,740

SUSPENDED MONORAIL BRAKE

Anson S. Bilger, San Francisco, Calif.

Application September 16, 1947, Serial No. 774,287

1 Claim. (Cl. 188—42)

This invention relates to a brake mechanism particularly intended for use on the truck or trucks of monorail railways of the suspended type.

A monorail railway of the suspended type, briefly stated, comprises a single elevated overhead rail supported by a heavy beam which in turn is supported by cross-arms carried by towers of suitable height. Travelling on the rail are trucks and suspended from the trucks and disposed below the rail and beam are passenger cars or other load carrying equipment. Each truck has two or more wheels which travel on and engage the upper surface of the rail. These wheels are equipped with drum, shoe brakes or the like which are air, manually or otherwise controlled, but they cannot always be depended upon, particularly on steep grades or when making quick stops.

The object of the present invention is to provide an emergency or supplementary brake on one or more of the trucks which is air, manually or otherwise controlled and which may be operated entirely independent of the wheel brakes. Another object of the invention is to provide a brake having a shoe or shoes which engage the under surface of the rail supporting beam and further to provide a simple, dependable mechanism whereby the brake shoes may be brought into or out of engagement with the under surface of the rail supporting beam, said mechanism being air, manually or otherwise controlled.

The brake mechanism is shown by way of illustration in the accompanying drawings in which, Fig. 1 is a side elevation of a monorail track, a truck mounted thereon and a load carrying body suspended from the truck, and Fig. 2 is an enlarged cross-section taken on line II—II Fig. 1.

Referring to the drawing in detail, A indicates a standard rail welded or otherwise secured to a beam B, which in turn is secured to a cross arm C carried by suitable spaced standards or towers, one of which is indicated at D (see Fig. 2).

Supported by wheels 3, riding on the track is a truck 4 and suspended from the truck by a pair of hanger arms 5—5 is a car 6, which may be constructed to carry passengers, freight or otherwise.

The invention as previously stated is directed to an emergency or supplemental brake mechanism which in this instance is generally indicated at E. The brake mechanism is supported by the truck and is mounted on a pair of channel shaped beams 6—6 which are secured to the hanger arms 5—5. The brake mechanism more specifically stated comprises a brake shoe 7 supported by the beam 6—6 through pairs of pivoted links 8—8. Secured to the lower surface of the shoe is a cam plate 9 and engaging such plate is a cam 10 which is actuated by a pivoted lever 11.

The lever is in turn operated by a link 12 which is connected with the piston rod 14 carried by a cylinder 15 which may be air or otherwise actuated.

In actual practice the upper surface of the shoe may be provided with a suitable lining to resist wear and this or the shoe proper will engage the lower surface of the beam B when braking action is supplied by the cylinder 15. The beam B presents a comparatively large surface and as the shoe may be just as wide as the beam and as long as desired, it is obvious that an efficient braking action is obtained; furthermore, as a brake shoe is forced upwardly against the under surface of the beam B when braking action is applied a downward pressure of equal force is applied to the truck and as the truck is supported on the track A by the wheels 3 it is certain that they cannot jump or climb the rail as they are held against the rail surface by the downward pressure on the truck; this is obviously a great improvement on shoe brakes heretofore employed which engage the upper surface of the rail and tend to lift the wheels up and away from the tracks when the brakes are applied.

Having thus described my invention, what I claim and desire to secure by Letters Patent is:

In a suspended monorail system of the character described including a rail, a supporting beam on which the rail is secured and a truck supported on the top of the rail by wheels and having a load carrying body suspended therefrom and disposed below the rail and its supporting beam: a brake mechanism comprising a brake shoe disposed longitudinally below the beam, pairs of parallel links pivotally connected at the upper end to the shoe and depending to be pivotally connected at the lower end to the truck, a cam rotatably mounted on the truck and movable against the lower face of the shoe to lift and press the upper face of the shoe against the beam and concurrently to pivot the pairs of parallel links with an upward component in the same direction, and an actuator mounted on the truck and connected to rotate the cam.

ANSON S. BILGER.

REFERENCES CITED

The following references are of record in the file of this patent:

UNITED STATES PATENTS

| Number | Name | Date |
|---|---|---|
| 560,226 | Morrison | May 19, 1896 |
| 722,720 | Lamb | Mar. 17, 1903 |
| 1,208,705 | Ayres | Dec. 12, 1916 |
| 1,944,603 | Hecker | Jan. 23, 1934 |
| 2,435,418 | Wright | Feb. 3, 1948 |

FOREIGN PATENTS

| Number | Country | Date |
|---|---|---|
| 509,272 | Germany | Sept. 25, 1930 |